United States Patent [19]

Rose

[11] 4,007,492
[45] Feb. 8, 1977

[54] ROTATIONAL SPEED MONITOR

[75] Inventor: Andrew M. Rose, Pittsburgh, Pa.

[73] Assignee: Sperry Rand Corporation, New York, N.Y.

[22] Filed: Apr. 4, 1975

[21] Appl. No.: 565,184

Related U.S. Application Data

[62] Division of Ser. No. 449,165, March 7, 1974, Pat. No. 3,900,796.

[52] U.S. Cl. .................................... 360/75; 317/5; 324/161; 340/263; 360/73
[51] Int. Cl.² ................. G11B 21/12; G11B 15/46; G11B 19/02; G01B 3/56
[58] Field of Search .................. 360/75, 73, 78, 97, 360/98–100, 137, 86; 324/161, 166; 317/5, 6, 9; 340/263, 268, 271

[56] References Cited

UNITED STATES PATENTS

| | | | |
|---|---|---|---|
| 3,147,462 | 9/1964 | Levinson et al. | 360/100 |
| 3,200,385 | 8/1965 | Welsh | 360/103 |
| 3,636,545 | 1/1972 | Boyd | 340/263 |
| 3,686,565 | 8/1972 | Kelem | 324/78 Q |
| 3,757,167 | 9/1973 | Yoshikawa | 317/5 |
| 3,893,178 | 7/1975 | Sordello | 360/86 |

Primary Examiner—Alfred H. Eddleman
Attorney, Agent, or Firm—Rene A. Kuypers

[57] ABSTRACT

A circuit is disclosed for monitoring the velocity of a rotating member and determining when its speed is below a predetermined value. The circuit arrangement is designed to compare the rotational speed of the member with an asynchronous AC line frequency. Signals produced by the circuitry are utilized for control purposes.

2 Claims, 4 Drawing Figures

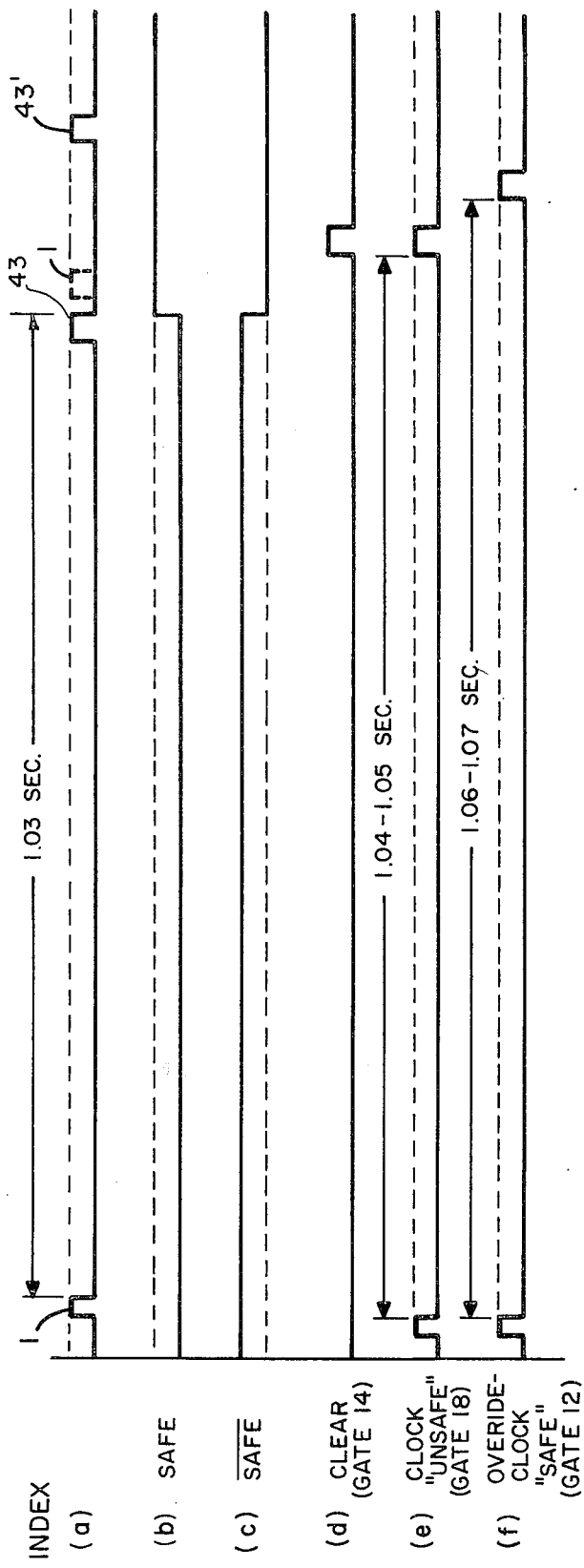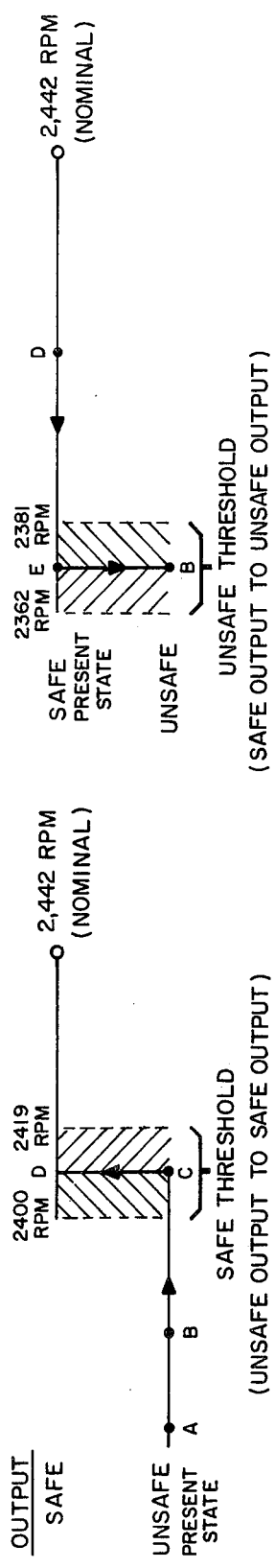

ROTATIONAL SPEED MONITOR

CROSS REFERENCE TO RELATED APPLICATION

This application is a division of patent application Ser. No. 449,165 filed Mar. 7, 1974, now U.S. Pat. No. 3,900,796.

BACKGROUND OF THE INVENTION

1. Field of the Invention

This invention relates in general to speed monitoring and in particular to speed monitoring which utilizes digital circuits entirely in a clock/counter mode.

2. Description of the Prior Art

A shortcoming of the known prior art has been the use of delay flops circuits in determining whether a rotating member has developed sufficient speed to sustain a flying magnetic read/write head. Discrete circuit components (i.e. RC network) have been utilized with prior art delay flop circuits for developing their period of operation. This circuitry has not proved entirely satisfactory since the delay flop period has drifted due to aging and temperature variations. Consequently, adjustments have been necessary in known prior art systems in order to maintain the delay flop circuit in proper operating condition. The accuracy drift due to aging and temperature as well as the need for adjustments has not been entirely satisfactory.

SUMMARY OF THE INVENTION

The circuit disclosed herein provides a revolution counter which monitors a once-per-revolution pulse of a rotating member. The revolution count is compared with a frequency source. A counter monitors the frequency source and provides a time within which there must be a predetermined number of revolutions for a flip-flop to be set. If there are not the necessary number of revolutions in the predetermined time (i.e., the rotational speed is too low) the flip-flop produces an "unsafe" output signal. Contrariwise, if the correct number of revolutions are generated within an allotted time a "safe" signal is produced. The "safe" signal indicates that the disc rotation is high enough to sustain a hydrodynamic air bearing for a flying magnetic head.

BRIEF DESCRIPTION OF THE DRAWINGS

FIG. 2 is a timing diagram of the signals produced by the circuitry disclosed in FIG. 1.

FIGS. 3a and 3b are graphic displays of the output signals produced by the circuitry disclosed in FIG. 1.

DESCRIPTION OF THE PREFERRED EMBODIMENTS

Figure 1:
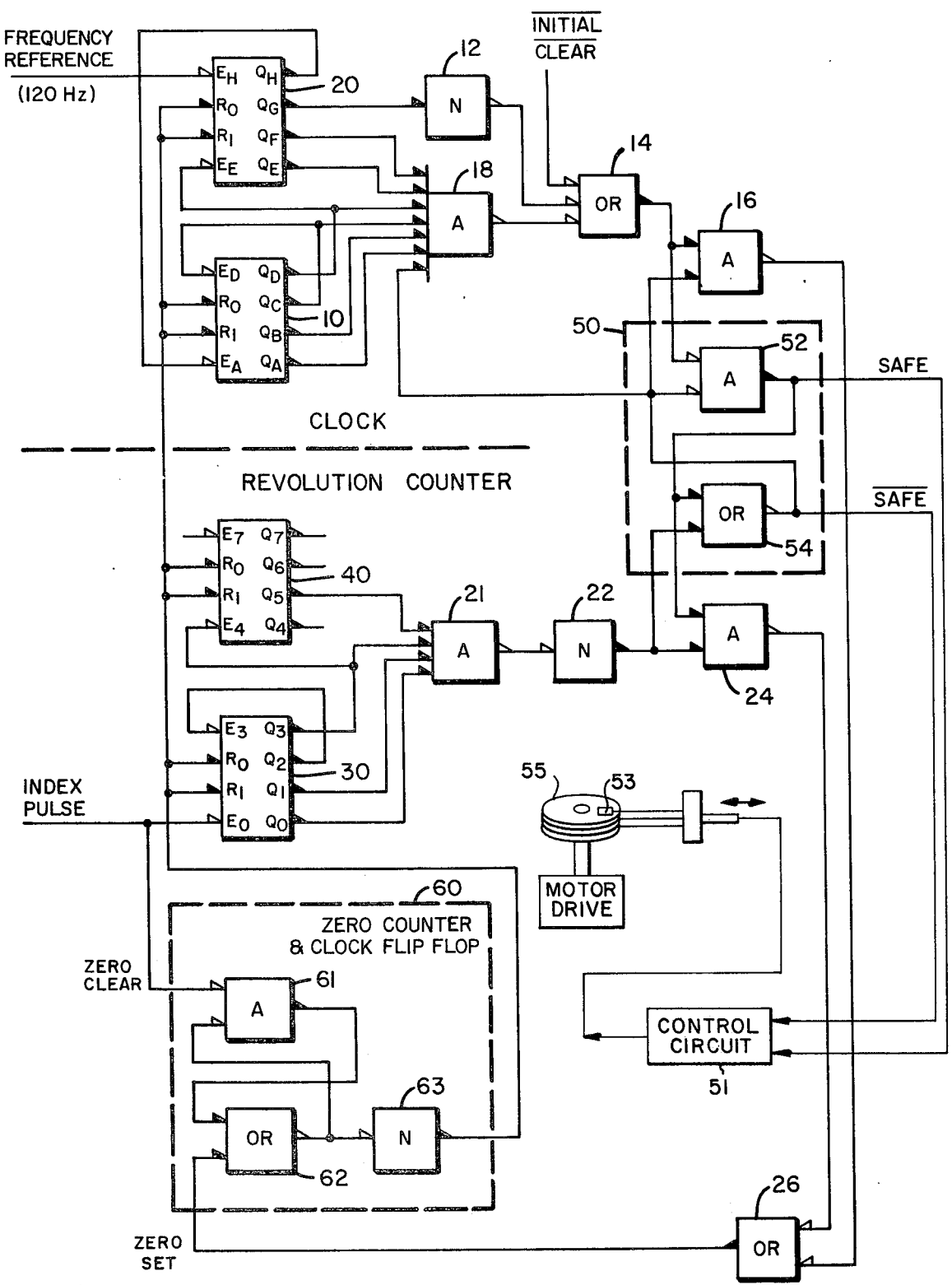
FIG. 1 is an overall circuit diagram of the preferred embodiment of the invention.

Referring now to FIG. 1, the circuit is shown as being essentially divided into two sections which consist of the clock section and the revolution counter section. The revolution counter section is composed essentially of two interconnected Four Bit Up-Counters 30 and 40 with direct clear input terminals $R_o$ and $R_1$. These counters, which are often referred to as Ripple-Through Counters, are designed so that when the inputs $R_o$ and $R_1$ have high (H) voltage inputs applied thereto, its output terminals are all low (L) voltage so that the counter is in a cleared state and ready to count after the H signal is removed.

The Up-Counters such as counter 30 are designed to be activated on the trailing edge of a positive going signal applied to the input terminal $E_o$ and produces a H signal at output terminal $Q_o$ for every two input pulses. For three input signals, terminals $Q_o$ and $Q_1$ would be H and for four signals, terminal $Q_2$ would be H and terminals $Q_1$ and $Q_o$ would be L. Therefore, it can be appreciated that when $Q_o$, $Q_1$, $Q_2$ and $Q_3$ are all H, 15 pulses will have counted, describing 14 time frames.

The output $Q_3$ of counter 30 is connected to the input terminal $E_4$ of counter 40. Therefore, in view of the serial connection between these two counters when terminals $Q_o$, $Q_1$, $Q_3$ and $Q_5$ are all H and NAND gate 22 is permissed, 42 time frames would be generated from 43 pulses (1+2+8+32).

The revolution counter is connected to an index pulse source. An index pulse is generated once per revolution of a rotating member such as a rotating disc (not shown). In view of a nominal speed of 2442 RPM of the disc rotation, an index pulse will be generated approximately every 24.6 milliseconds. Accordingly, when terminals $Q_o$, $Q_1$, $Q_3$ and $Q_5$ are all H, a time period of 1.03 seconds will have elapsed (i.e., $Q_o=1$, $Q_1=2$, $Q_3=8$ and $Q_5=32$.).

The index pulse is further connected to the NOR gate 61. The NOR gate 62 together with NOR gate 61 and inverter 63 comprise the zero-counter-and-clock flip-flop 60. This will be discussed in greater detail hereinafter.

The index pulse is a positive going signal as shown in FIG. 2 whereat at the quiescent level the index voltage level is at ground potential. The index pulse is shown to be positive going and reaches a voltage level of +V.

The clock section of the rotational speed monitor also includes two Four Bit Up-Counters 10 and 20 which are interconnected with one another. A 120 hertz frequency signal is applied to the input terminal $E_H$ of counter 20 and the first output $Q_H$ is returned to the input $E_A$ of counter 10. The 120 hertz signal is obtained in the preferred embodiment by rectifying a 60 hertz AC line frequency. This signal is chosen in view of its relative stability. It is also recognized however that other stable frequency sources may be readily employed.

In the manner previously described $Q_H$, $Q_A$, $Q_B$, $Q_C$, $Q_D$, $Q_E$, $Q_F$ and $Q_G$ produce a respective count 1, 2, 4, 8, 16, 32, 64, 128. The seven outputs of $Q_A$ to $Q_F$ are applied to the NAND gate 18. When the outputs $Q_A$ to $Q_F$ are all H, 126 (2+4+8+16+32+64) pulses or 125 time frames will have been counted by counters 10 and 20. In other words, since the time period of 120 hertz is approximately 8.33 milliseconds, a time period of about 1.04 seconds will have elapsed after the counters 10 and 20 have counted the 126 pulses.

The output $Q_G$ represents a count of 128 pulses when terminals $Q_A$ to $Q_G$ are all H. Therefore, a time period of 127 frames or approximately 1.06 seconds transpires after $Q_A$ to $Q_G$ all become H.

In summary, the revolution counter is designed to produce a L output signal at NAND gate 21 when $Q_o$, $Q_1$, $Q_3$ and $Q_5$ are all H input signals. This occurs after a time period of 1.03 seconds when the disc is rotating at its nominal speed. However, when the disc is not rotating at its nominal speed, the NAND gate 21 would tend to become fully permissed in a longer period of time and if that longer time exceeds 1.04 seconds the revolution counter will be reset or cleared as explained hereinafter. Since at start-up time gate 21 does not produce a L output, the output from inverter 22 is L which causes a H output from gate 54. Also, the NAND gate 18 is permissed when input signals $Q_A$ to $Q_F$ are H and the output of NOR gate 54 is H and this occurs after about 1.04 seconds after the clock starts counting. Finally, a positive signal is produced at the input terminal of inverter 12 after the clock starts counting approximately 1.06 seconds.

The circuitry disclosed also provides a Safe-Unsafe flip-flop 50, which is shown as being surrounded by dotted lines. The flip-flop 50 is a set-reset type which is formed by the NOR gate 52 and the NOR gate 54. The flip-flop 50 produces a H output at the $\overline{SAFE}$ terminal when the rotational speed of the rotating member is below a desired or unsafe speed.

In the preferred embodiment of the invention the rotating member is a memory disc which is utilized to store information on its surface. As is well known, the disc may be made of iron-oxide or nickel-iron. In any event, a flying magnetic head is utilized with such a rotating disc so that a hydrodynamic air bearing formed over the disc sustains the head in close proximity to the memory surface. The distance required between the head and the surface is conventionally between 20-50 microinches and therefore the air bearing produced by the disc must be able to provide an air film to maintain the head at the required distance.

It is apparent therefore that if the disc is rotating at a certain required speed, an air film will be formed above the disc to maintain a flying head. On the other hand, if the speed is not sufficient to produce an air bearing, the head cannot be positioned over the disc without damaging the head and/or the disc. This results in costly down time of a computer which is not desirable or satisfactory.

Let us now consider the operation of the circuitry and further let us assume that the disc is not rotating. It is assumed initially that all inputs to the NAND gate 14 are H. Its output therefore will be L. In order to initiate operation the Initial Clear signal, which is normally H, is momentarily activated thereby causing a L signal to be produced at the input of gate 14. The output of NAND gate 14 thereby reverts to the H state and is applied simultaneously to one of the inputs of NAND gate 16 and NOR gate 52. The H signal applied to gate 52 will cause the flip-flop 50's SAFE output to go L. This L signal together with the second L signal produced by the revolution counter, since it is assumed that the disc is not rotating, will cause the flip-flop 50 to assume the reset state and the $\overline{SAFE}$ signal to become H. The H output of gate 54 is applied as a second input to NAND gate 16. Since both inputs to NAND gate 16 are H its output is L. This L input signal causes the NAND gate 26 to be conditioned and a H output is produced thereat which is applied to the NOR gate 62 of the zero-counter-and-clock flip-flop 60.

The H input signal applied to NOR gate 62 causes its output to become L and after inversion by the inverter 63 the signal becomes H. This H output is applied to the terminals $R_0$ and $R_1$ of the respective ripple counters 10, 20, 30 and 40 which causes the latter to clear and all of the outputs revert to the L level. The L level output of NOR gate 62 is also applied to the NOR gate 61. When no index pulses are being generated, a L signal (see FIG. 2a) is produced which is applied to the second input of the gate 61 thereby causing its output to revert to the H state. This H signal which is applied to NOR gate 62 keeps the flip-flop in the set state after the SET signal from gate 26 is terminated whether the set signal was produced by the initial clear, a clock decode or a count decode. The counters will now stay jammed in the clear state until the first index pulse appears.

Let us now assume that the disc drive (not shown) is activated causing the disc to begin rotating and index pulses to be generated once per revolution. In view of the great mass of the system particularly when a disc pack (i.e., a plurality of discs) is placed on a disc drive shaft it is apparent that a great deal of time is required to attain the nominal speed of approximately 2442 RPM. The index pulses (see FIG. 2($a$)) that are generated are directed into the input $E_0$ of the counter 30 as well as to one of the input terminals of the NAND gate 61 of the zero counter and clock flip-flop 60. The index pulse is positive going and as such reaches a level of +V. The positive going pulse applied to NOR gate 61 immediately resets the flip-flop 60 causing the output of the inverter 63 to go L which signal is applied to the respective terminals $R_0$ and $R_1$ of counters 10, 20, 30 and 40. Accordingly the counters 30 and 40 of the revolution counter are now ready to count index pulses and the counters 10 and 20 are ready to count clock pulses. It should be noted hereat that as soon as the index pulse reaches the positive level, the flip-flop 60 is reset and the H signal is removed from the clear terminals of the counter, whereas the trailing negative-going edge of the index pulse is utilized to activate the counters. Therefore, it should be apparent to those skilled in the art that a race condition is obviated by the time difference between when the index pulse reaches +V and when it begins to go negative along the trailing edge.

Under the assumption of a large mass rotating system starting from rest, the index pulses will be generated very slowly such that when all inputs to the NAND gate 21 are H (i.e., 42 index time periods have been counted) the time period of 1.03 seconds will have been exceeded. This is represented by the pulse 43' in FIG. 2($a$).

As mentioned above, simultaneously with the application of index pulses to the revolution counter, the clear is removed from the clock and the 120 hertz clock signal applied to input terminal $E_H$ causes the clock to start timing. As previously described, the clock decode produced by gate 18 recognizes 126 pulses or 125 time periods. Thus the time from the first pulse to the 126th pulse will be about 1.04 seconds. Since the index pulses are asynchronous with respect to the 120 hertz clock reference, the first clock pulse which marks the beginning of the first of the 125 time periods, will not occur at any fixed relation to the first index pulse ("first" of any cycle being defined as the pulse which resets the zero-counter-and-clock flip-flop). Thus, the time from the first index pulse to the beginning of the first clock period can vary from 0 to 8.3 milliseconds. Adding this to the 1.04 seconds or the 1.06 seconds always developed by the clock, the time from the first index pulse to the time that the gates 18 and 12 are permissed can vary from about 1.04 to 1.05 or from 1.06 to 1.07 seconds, and assuming that there is an enable gate signal from gate 54 to gate 18. This uncertainty is reflected on the graphs of FIG. 3, which will be discussed in greater detail later in the text. Therefore, after a time lapse of between 1.04 and 1.05 seconds all inputs to NAND gate 18 will be H and its output will go L.

This L signal will be directed to the NAND gate 14 whose output will go H and will be applied to the NOR gate 52 as well as to the NAND gate 16. The H signal to these gates will cause the flip-flop 50 to remain reset thereby indicating an unsafe (i.e., $\overline{SAFE}$ is H) condition. The two H inputs to NAND gate 16 will cause its output to switch to L which will revert to H after passing through NOR gate 26. It should be noted that the second input to the gate 26 will be H so that L output of gate 16 is controlling in producing a H output signal from NOR gate 26.

The H output signal from gate 26 is applied to NOR gate 62 to produce a L level signal which becomes H (see FIG. 2(d)) after passing through inverter 63. This H signal is applied to terminals $R_0$ and $R_1$ of the counters 10, 20, 30 and 40 thereby clearing the latter. The L output of NOR gate 62 is also applied to NOR gate 61 as soon as the second input of NOR gate 61 goes L (i.e., there is no index pulse) its output reverts to the H state thereby latching the flip-flop 60.

In summary, therefore the instant circuitry provides that when the disc is not rotating at a sufficiently high speed to maintain the air bearing for a magnetic flying head, the flip-flop 50 will be placed in the reset state so that the $\overline{SAFE}$ signal will be H. This H signal will be applied to the control circuitry 51 so that the magnetic head 53 will not be loaded onto the discs 55 for a read/write cycle of operation. Furthermore, the instant invention provides that the counters 10, 20, 30 and 40 are jammed to the clear state so that counting can be re-initiated. This operation occurs approximately 1.04 to 1.05 seconds after the flip-flop 50 has failed to indicate that the rotation speed is safe for operation.

Let us now assume that the disc rotation has reached its nominal speed of 2442 RPM after the counters 10, 20, 30 and 40 have all been placed in the clear state. In the manner previously described, the Ripple Counters 30 and 40 will count index pulses such that when 43 indices are counted all four inputs to the NAND gate 21 are H. Accordingly, when 43 index pulses or 42 time frames have been produced $Q_0$, $Q_1$, $Q_3$, and $Q_5$ are all H. As was previously mentioned, for the counters 30 and 40 to count 42 time frames a time period of approximately 1.03 seconds elapses when the rotating disc is operating at nominal speed (see FIG. 2a). Therefore, the four H inputs to NAND gate 22 causes its output to go L which is in turn inverted to the H level by the inverter 22. This H signal is applied to the NOR gate 54 whose output reverts to the L state, as well as to the NAND gate 24. Since the output of the NAND gate 14 remains L during this time period, the NOR gate 52 will be conditioned and the SAFE output will go H (see FIG. 2(b)) and $\overline{SAFE}$ output will go L (see FIG. 2(c)). The H output of the NOR gate 52 is applied as the second input to the NAND gate 24 thereby causing its output to go L. The L input applied to the NOR gate 26 causes its output to go H thereby causing the zero counter and clock flip-flop 60 to again be set and all of the counters, 10, 20, 30 and 40 are again zeroed.

To recapitulate what is shown by the wave forms of FIG. 2, initially with the flip-flop 50 indicating the unsafe condition after an initial clear, the circuit counts clock pulses as indicated by waveform 2(e) until 126 pulses have been counted representing a time interval of about 1.04 seconds. When this point is reached the NAND gate 18 of FIG. 1 generates a pulse which clears the counter. In the meantime the revolution counter counts index pulses two of which are shown in FIG. 2(a), and assuming that the disc is not up to safe speed the system would tend or attempt to have the NAND gate 21 generate a pulse when 43 index pulses have been counted. Pulse 43' of FIG. 2(a) illustrates a possible or theoretical time position when the time period 1.03 seconds has been exceeded. However, 43' is not generated because the clear signal is generated (FIG. 2d) before this time is reached.

As the speed of the disc increases, the 43rd index pulse occurs progressively earlier until it precedes the 126th clock pulse. When this happens the pulse from the gate 18 of FIG. 1 is applied to the NAND gate 14 whose output then causes the safe speed flip-flop to be set so that the SAFE output goes H and the $\overline{SAFE}$ output goes L. The switching of the flip-flop also removes one H input from the NAND gate 18 so that on the succeeding cycles the clock counter will also produce an output pulse from terminal $Q_G$ through the inverter 12 when it has counted up to 128 pulses representing 1.06 seconds as shown in FIG. 2(f). This aspect is discussed in greater detail hereinafter.

The switch from an unsafe indication to a safe indication can best be understood with the aid of FIG. 3a. Initially, the disc pack is started up from a rest condition. The output will be indicating an unsafe speed since the initial clear signal is applied to NAND gate 14 to force the initial state. As the speed gradually increases from stopped, it goes from A to B towards C (see FIG. 3a), the safe threshold.

As can be seen on FIG. 3a, point C may be between 2,400 RPM and 2,419 RPM. These limits are obtained by calculating that 1.05 seconds of detection time represents approximately 2,400 RPM (i.e., 1.03/1.05 × 2,442) and 1.04 seconds represents 2,419 RPM.

In the manner previously described, sample cycles are initiated by the once-per-revolution index pulses and ended as long as the velocity is unsafe by the clock circuit after 1.04 to 1.05 seconds before being restarted by the once-per-revolution pulses. Eventually the speed increases to the threshold region, which is when the disc rotation developes 42 revolutions in slightly less than 1.05 seconds or just faster than 2,400 RPM as seen in FIG. 3a.

As mentioned previously, 1.05 seconds is the longest possible clock cycle with an unsafe output. If the timing between the cycle restarting once-per-revolution pulse and the first frequency pulse of the same cycle causes the period of 1.05 seconds, the output of flip-flop 50 will swing safe as the disc speed developes 42 revolutions in slightly less than 1.05 seconds, which is 2,400 RPM. If the period of 1.05 seconds was not developed, the disc speed would have to continue to rise to a threshold that developed 42 revolutions in no less than 1.04 seconds. Thus, the clock period forces the limits of 42 revolutions between 1.05 seconds or 2,400 RPM and 1.04 seconds or 2,419 RPM. This span of RPM's indicates the average velocity over 42 revolutions.

In a slow acceleration system the instantaneous velocity at the beginning of a timing cycle and the instantaneous velocity at the end may be separated by only a few RPM. Since the clock period can vary to the limits on each cycle, a problem arises when the disc speed just passes the 1.05 second threshold during a 1.05 second clock period thereby switching the output to safe, and the following cycle has a clock period of 1.04 seconds. Due to the low acceleration, the disc speed will not be high enough to cause a safe output in this period and the output would revert back to the unsafe condition. This chattering could continue as long as the average disc velocity is insufficient to generate a safe output in 1.04 seconds. To prevent any possibility of this chattering, the clock is designed to switch its time period once a safe output is generated.

This time period switch is accomplished by disabling gate 18 when the $\overline{SAFE}$ signal (gate 54) goes L indicates a speed safe detection. In other words, gate 54 is L since the flip-flop 50 is now latched by the revolution counter. The clock must now count 128 time pulses instead of 126 and will have a period between 1.06 seconds and approximately 1.07 seconds. As understood, this variation results from the possible 8.3 milliseconds variation from the first index pulse to the beginning of the first clock period in view of the asynchronous nature of the system. Therefore, the new time period results in a lowering of the threshold (see FIG. 3b) as soon as a safe signal is produced and prevents chattering under all conditions. Thus, once the disc develops 42 revolutions on a 1.05 second or shorter time frame and the clock allows the output to switch to safe, the clock period is switched and the disc has at least 1.06 seconds to do 42 revolutions. The period of 1.06 seconds represents approximately 2,381 RPM and is calculated in the manner discussed above. As also discussed previously, this time period may be extended to 1.07 seconds in view of the variation between the first index pulse to the beginning of the first clock period. This time period is represented by 2,362 RPM in FIG. 3b. The shaded area of FIG. 3b indicates the unsafe threshold for a decreasing velocity.

Accordingly, it can be appreciated that the shaded areas both in the safe threshold and the unsafe threshold represent uncertainty regions due to the non-synchronous clock operation and the once-per-revolution index pulses. Furthermore, it can be seen that once the disc speed has reached the safe threshold region of FIG. 3a and has produced a safe output signal, the system automatically provides a lower threshold (FIG. 3b) to prevent a chattering condition.

The same chattering problem would be present as the pack slows down if gate 18 were not reactivated once the output reverts from safe to unsafe. The switching of gate 18 means that the disc must produce 42 revolutions in at most 1.05 seconds and then only in at least 1.06 seconds. Once the discs cannot develop 42 revolutions in at least 1.06 seconds, they only have to be unable to produce 42 revolutions in 1.05 seconds. In other words, the threshold has now switched from that shown in FIG. 3b to that of FIG. 3a.

It can be readily seen therefore that if 42 index pulse time frames are counted in a time period of 1.03 seconds the circuitry disclosed will interpret this as being a safe condition for the magnetic head to be positioned on the disc. Therefore, the revolution counter will automatically clear the revolution and clock counters so that the speed of the disc can be immediately resampled again. This resampling will be initiated upon the detection of the next index pulse. Thus, when the disc is rotating at nominal speed, the circuitry will count index pulses and the clock will run for 1.03 seconds at which time the 43rd pulse ends the 42nd time-frame, and the counter and clock are cleared until the next index pulse occurs 24.6 milliseconds later.

What is claimed is:

1. The method of lowering a read-write device onto a rotating recording medium comprising the steps of,
    a. generating a first threshold value comprising two separated rotational speeds,
       said read-write device being brought into juxtaposition with said recording medium when the medium's rotational speed reaches said threshold;
    b. switching to a second threshold value comprising two separated rotational speeds upon reaching said first threshold,
       the second threshold value being lower than the first threshold value,
       said switching from a first to a second threshold preventing the in and out movement of said read-write device with respect to said recording medium.

2. The method of lowering a read-write device onto a rotating recording medium comprising the steps of,
    a. providing a stable reference frequency signal;
    b. providing signals indicative of the rotational speed of said rotating member;
       said reference frequency signals and said signals indicative of the speed of said rotating member being asynchronous with respect to one another;
    c. generating a first threshold comprising two separated rotational speeds,
       said first threshold being produced by the rotational speed signals,
       said read-write device being brought into juxtaposition with said recording medium upon reaching said first threshold;
    d. switching automatically to a second threshold that is generated by said frequency reference signals and comprising two separated rotational speeds which are lower than said first threshold, said switching from said first to said second threshold preventing the chattering of said read-write device.

* * * * *